United States Patent [19]
Ban et al.

[11] Patent Number: 5,727,510
[45] Date of Patent: Mar. 17, 1998

[54] VISCOUS FLUID TYPE HEAT GENERATOR WITH MEANS FOR MAINTAINING OPTIMUM LUBRICATING CONDITION OF A BEARING

[75] Inventors: Takashi Ban; Hidefumi Mori; Kiyoshi Yagi, all of Kariya, Japan

[73] Assignee: Kabushiki Kaisha Toyoda Jidoshokki Seisakusho, Kariya, Japan

[21] Appl. No.: 705,659

[22] Filed: Aug. 30, 1996

[30] Foreign Application Priority Data

Sep. 4, 1995 [JP] Japan ................... 7-226396

[51] Int. Cl.⁶ .......................................... F22B 3/06
[52] U.S. Cl. ................ 123/142.5; 122/26; 126/247
[58] Field of Search ............... 122/26; 126/247; 123/142.5 R; 237/12.3 R

[56] References Cited

U.S. PATENT DOCUMENTS 4,974,778 12/1990 Bertling ..................... 237/12.3 B
4,993,377 2/1991 Itakura et al. ............... 123/142.1 R
5,573,184 11/1996 Martin ........................ 237/12.3 R Primary Examiner—Henry Yuen
Assistant Examiner—Hieu T. Vo
Attorney, Agent, or Firm—Burgess, Ryan & Wayne

[57] ABSTRACT

A viscous fluid type heat generator adapted for being incorporated in a heating system has front and rear housings in which a heat generating chamber containing therein a viscous fluid and a heat receiving chamber permitting a heat exchanging liquid to flow therethrough. The heat generator also has a drive shaft rotatably supported by an anti-friction bearing unit and having mounted thereon a rotor element rotating in the heat generating chamber to apply a shearing action by which the viscous fluid generates heat absorbed by the heat exchanging liquid flowing in the heat receiving chamber. The heat generator has an intermediate substance unit arranged between the heat generating chamber and the anti-friction bearing unit so as to provide a thermal isolation therebetween. The intermediate substance unit may be a shaft sealing unit, a closed vacant chamber or a combination of the shaft sealing unit and the closed vacant chamber.

12 Claims, 4 Drawing Sheets

VISCOUS FLUID TYPE HEAT GENERATOR WITH MEANS FOR MAINTAINING OPTIMUM LUBRICATING CONDITION OF A BEARING

BACKGROUND OF THE INVENTION

1. Field of the Invention

The present invention relates to a viscous fluid type heat generator of the type in which viscous fluid confined in a closed space is subjected to a shearing action by a rotating body so as to generate heat to be absorbed by a heat exchanging liquid, typically water, flowing through a heat receiving chamber. The heat absorbed by the heat exchanging liquid can be used for warming, for example, the air in an object to be warmed. The viscous fluid type heat generator of the present invention may be advantageously used as a heat generating source incorporated in, for example, a heating system or a climate control system of an automobile.

2. Description of the Related Art

U.S. Pat. No. 4,993,377 to Itakura discloses an automobile heating apparatus in which a viscous fluid type heat generator is incorporated. The viscous fluid type heat generator described in U.S. Pat. No. '377 includes a pair of mutually opposing front and rear housings tightly secured together by through-bolts to define an inner heat generating chamber and a heat receiving chamber separated by a partition wall through which the heat is exchanged between the viscous fluid in the heat generating chamber and the water in the heat receiving chamber. The heat receiving chamber is therefore arranged to be located outside but in close relation with the heat generating chamber. The heat exchanging water is introduced into the heat receiving chamber through a water inlet port and delivered from the heat receiving chamber toward an external heating system, and the water is constantly circulated through the heat generator and the external heating system.

A drive shaft is rotatably supported in the front housing via an anti-friction bearing so as to support thereon a rotor in such a manner that the rotor is rotated with the drive shaft within the heat generating chamber. The rotor has outer faces which are face-to-face with the wall faces of the heat generating chamber and form labyrinth grooves therebetween, and a viscous fluid, for example, silicon coil is supplied into the heat generating chamber so as to fill the labyrinth grooves between the rotor and the wall faces of the heating chamber.

When the viscous fluid type heating generator incorporated in the heating system of an automobile is operatively connected to the automobile engine, the drive shaft is rotated to rotate the rotor within the heat generating chamber while applying a shearing action to the viscous fluid in the heating chamber. Thus, the viscous fluid generates heat when being sheared, and heat exchanging is conducted between the viscous liquid within the heat generating chamber and the water flowing through the heat receiving chamber. The heated water is circulated through the heating system of the automobile so as to warm the compartment within the automobile.

In the above-described conventional viscous fluid type heat generator, the heat generating chamber is not fluidly isolated from the interior of the anti-friction bearing fitted in the casing, and is sealed against the outer atmosphere only by a lubricant (grease) filled in the anti-friction bearing. Thus, the viscous fluid thermally expanded by heat within the heat generating chamber easily enters the interior of the anti-friction bearing and urges the grease to flow out of the interior of the bearing toward the outside thereof. As the viscous fluid such as the above-mentioned silicone coil usually has no ability for lubricating the bearing, the viscous fluid entering the bearing so as to replace the grease will cause a lack of lubrication for the bearing resulting in reduction in the operating life of the anti-friction bearing. Consequently, the operating life of the heat generator itself is in turn reduced. Further, in the construction of the conventional heat generator, the anti-friction bearing for rotatably supporting the drive shaft is positioned adjacent to the heat generating chamber, and accordingly, the bearing is easily heated by the viscous fluid within the heat generating chamber. Therefore, the grease filled in the bearing can be melted away to eventually cause lack of lubrication for the bearing. Thus, an improvement in the disposition of the bearing is necessary for prolonging the operating life of the viscous type heat generator.

SUMMARY OF THE INVENTION

An object of the present invention is to provide a viscous type heat generator provided with means for maintaining a long operating life thereof under an optimum lubricating condition of a bearing or bearings incorporated therein.

Another object of the present invention is to provide a viscous type heat generator having an anti-friction bearing for rotatably supporting a drive shaft and means for thermally isolating the bearing from the heat generating viscous fluid to maintain good lubrication for the bearing even after long usage of the heat generator.

In accordance with the present invention, there is provided a viscous fluid type heat generator which comprises front and rear housings for defining therein at least a heat generating chamber having inner walls thereof, a heat receiving chamber arranged in at least one of the front and rear housings separated from the heat generating chamber and forming a fluid flow passage extending in close relation with the heat generating chamber and permitting a heat exchanging liquid to circulate therethrough, a drive shaft rotatably supported by the front housing via an anti-friction bearing unit, a rotor element mounted on the drive shaft so as to be rotated therewith within the heat generating chamber, viscous fluid supplied in a space extending between the inner walls of the heat generating chamber and outer faces of the rotor element to generate heat in response to rotation of the rotor element, and an intermediate isolation means disposed between the heat generating chamber and the anti-friction bearing unit for providing a thermal isolation therebetween.

Preferably, the intermediate isolation means comprises a shaft sealing element arranged in the front housing for sealing around the drive shaft.

The intermediate isolation means may comprise a closed vacant chamber formed by and enclosed by a portion of inner walls of the front housing. Then, the viscous fluid thermally expanded by heat is prevented from flowing from or oozing out of the heat generating chamber toward the anti-friction bearing unit due to an existence of the closed vacant chamber between the heat generating chamber and the anti-friction bearing.

Further, the closed chamber disposed between the heat generating chamber and the anti-friction bearing unit can be effective for positively placing a space between the bearing unit and the heat generating chamber, and therefore, transmission of heat from the viscous fluid within the heat generating chamber to the bearing unit can be appreciably reduced. In addition, the viscous fluid thermally expanded by heat can be prevented from leaking out of the heat generating chamber toward the outside of the heat generator. The intermediate isolation means substance unit may comprise a combination of the shaft sealing member and the closed vacant chamber axially juxtaposed between the heat generating chamber and the anti-friction bearing unit.

Alternatively, the anti-friction bearing unit for supporting the drive shaft may be mounted in a bearing chamber formed in a front boss portion projecting frontward from a central portion of the front housing. Since the bearing chamber in the boss portion is located at a position exposed to the outer atmosphere, the anti-friction bearing unit can communicate with the atmospheric air and be constantly cooled during the operation of the viscous fluid type heat generator. Thus, the lubricating grease filled in the anti-friction bearing unit can be certainly held within the bearing unit during a long operating life of the bearing unit.

BRIEF DESCRIPTION OF THE DRAWINGS

The above and other objects, features and advantages of the present invention will be made more apparent from the ensuing description of preferred embodiments thereof in conjunction with the accompanying drawings wherein.

DESCRIPTION OF THE PREFERRED EMBODIMENTS

Figure 1A:
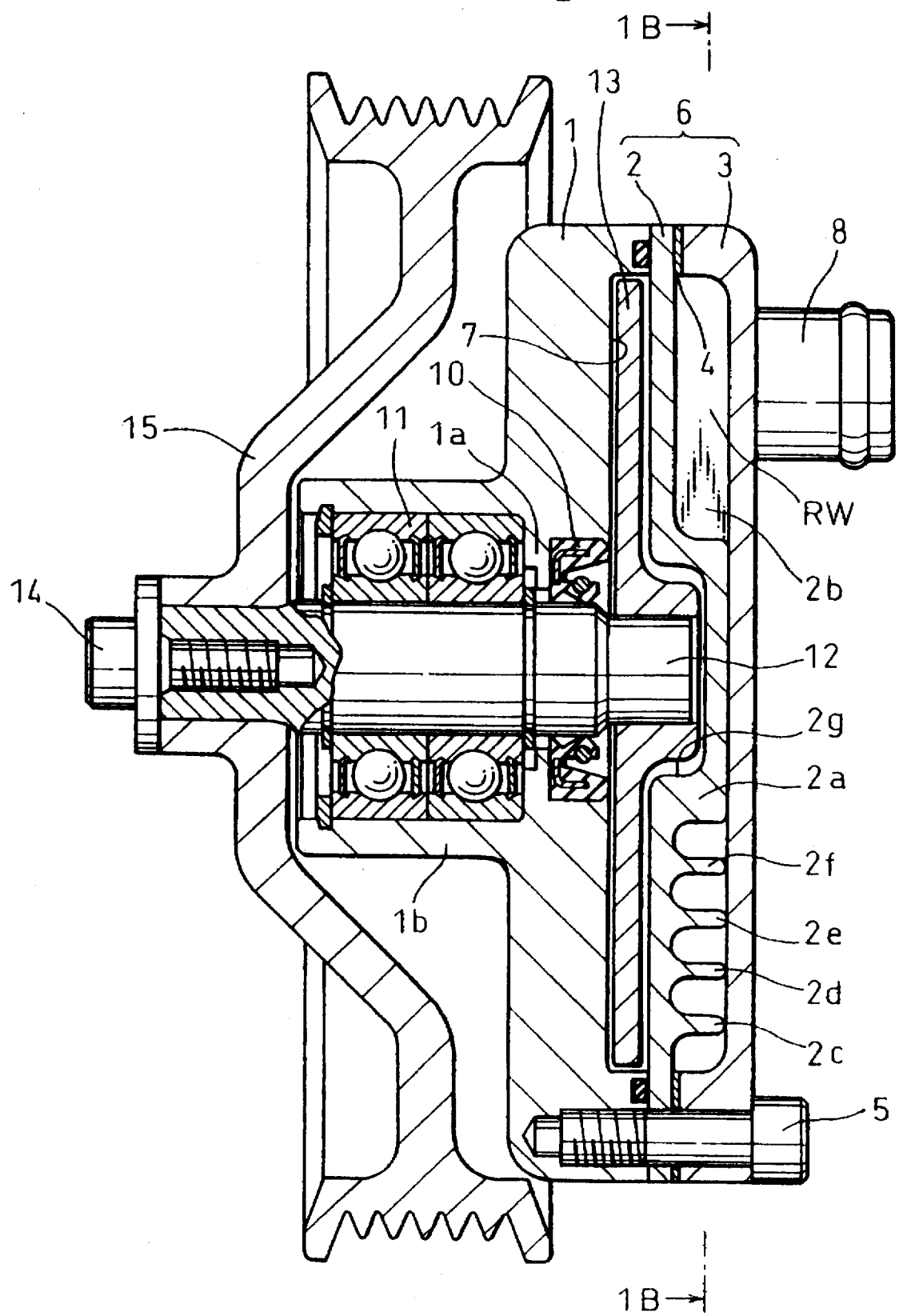
FIG. 1A is a cross-sectional view of a viscous fluid type heat generator according to an embodiment of the present invention.
Figure 1B:
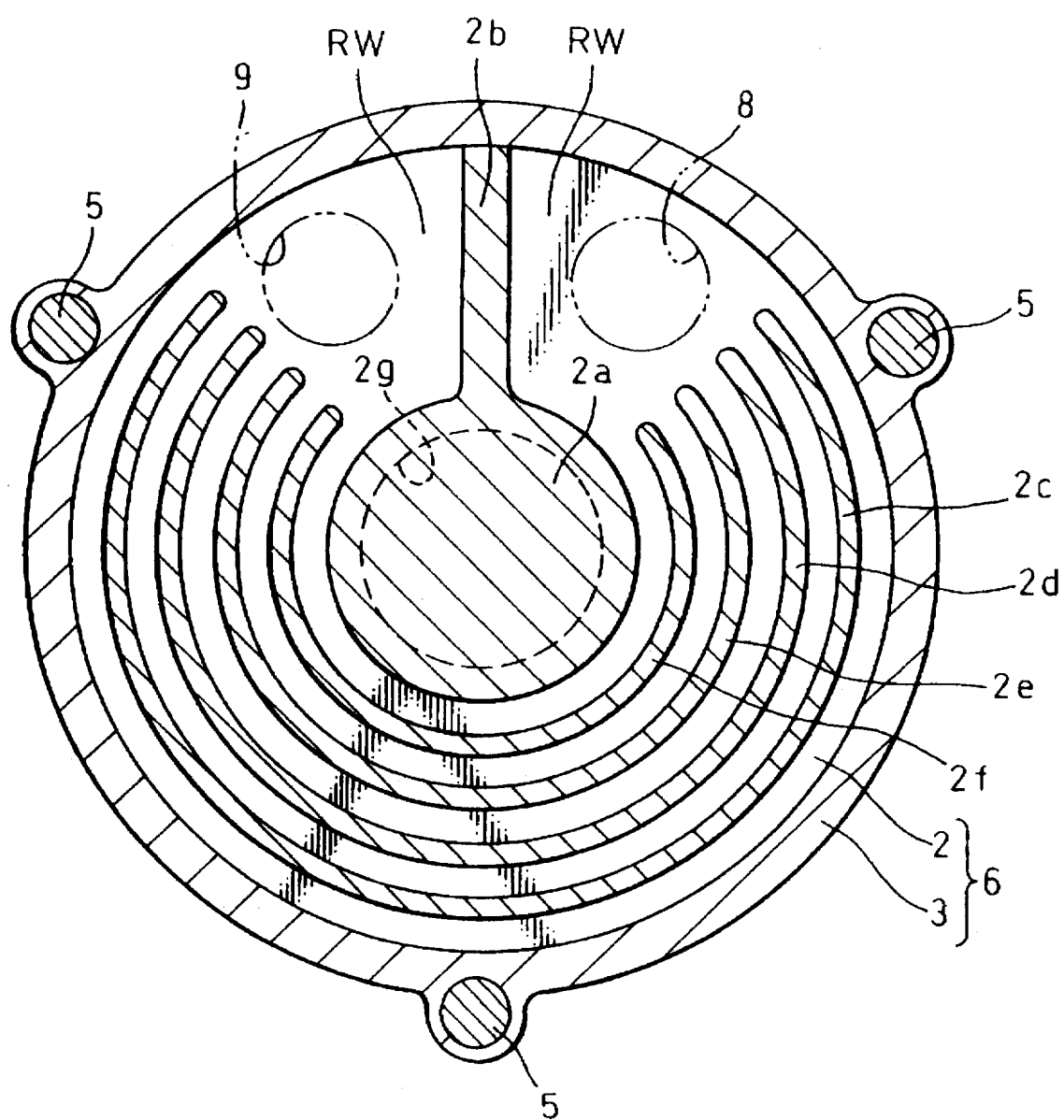
FIG. 1B is a cross-sectional view, taken along the line 1B—1B of FIG. 1A, illustrating the particular shape of a rear plate incorporated in the viscous fluid type heat generator of FIG. 1A.

Referring to FIGS. 1A and 1B, a viscous fluid type heat generator includes a front housing 1, a rear plate 2, and a rear housing body 3 which are axially securely connected together by a plurality of screw bolts 5, via a gasket 4 arranged between the rear housing body 3 and the rear plate 2. The rear plate 2 and the rear housing body 3 constitutes a rear housing 6. The front housing 1 and the rear housing body 3 are preferably made of an iron system metallic material having a large mechanical rigidity, and the rear plate 2 is preferably made of an aluminum system material having a good thermal conductivity. Nevertheless, the front housing 1 and the rear housing body 3 may be made of an aluminum material, if necessary, from the viewpoint of reducing the weight of a viscous fluid type heat generator. The front housing 1 is provided with a counterbored portion at a generally rear end thereof, which portion forms a heat generating chamber 7 when the rear end of the front housing 1 is closed by the rear plate 2 having a generally flat inner face thereof extending around a central recess 2g thereof. The outer face of the rear plate 2 and the inner face of the rear housing body 3 form a heat receiving chamber RW therebetween. The heat receiving chamber RW is separated from the above-mentioned heat generating chamber 7 by the rear plate 2. The heat receiving chamber RW is provided with an inlet port 8 formed at a portion of an outer periphery of the rear housing body 3 for introducing a heat exchanging liquid such as water into the heat receiving chamber RW. More specifically, the heat exchanging liquid circulates through the viscous fluid type heat generator and the external heating system as a heat transfer medium, and therefore, when the heat exchanging liquid returns from the external heating system, it flows into the heat receiving chamber RW through the inlet port 8 so that the heat exchanging liquid receives heat from the viscous fluid within the heat generating chamber 7 through the rear plate 2. The fluid having received heat flows out of the heat receiving chamber RW through an outlet port 9 (FIG. 1B) similarly formed at a different portion of the outer periphery of the rear housing body 3. The outlet port 9 of the heat exchanging liquid is arranged relatively close to the inlet port 8.

The rear plate 2 is provided with a central projecting portion 2a projecting rearward, and having therein the afore-mentioned central recess 2g of the heat generating chamber 7. The central projecting portion 2a of the rear plate 2 is provided with a radial wall 2b extending radially from the central projecting portion 2a between the inlet port 8 and the outlet port 9. Thus, the heat exchanging liquid entering the heat receiving chamber RW through the inlet port 8 is prevented from directly flowing into the outlet port 9 before it receives heat from the viscous fluid of the heat generating chamber 7.

The rear plate 2 is also provided with a plurality of (four in the present embodiment) fins 2c through 2f circularly extending from a position close to the inlet port 8 to a position close to the outlet port 9 to enhance the thermal conductivity of the rear plate 2. The fins 2c through 2f are concentric and radially equidistantly arranged as best shown in FIG. 1B. The fins 2c through 2f as well as the central projecting portion 2a and the radial wall 2b are arranged so that the ends of these fins, the projecting portion, and the radial wall abut against the inner face of the rear housing body 3.

In the front housing 1, a drive shaft 12 is rotatably supported by a bearing device 11 having a pair of juxtaposed anti-friction bearings which are received in a bearing chamber of the front housing 1. Namely, the front housing 1 has a centrally arranged front boss 1b forming therein the above-mentioned bearing chamber of the bearing device 11. The front housing further has a shaft sealing device 10 centrally mounted therein at a position axially adjacent to the heat generating chamber 7 and surrounding an inner end portion of the drive shaft 12. The front housing 1 still further has an annular flange 1a formed therein at a position surrounding the drive shaft 12 and axially between the shaft sealing device 10 and the bearing device 11. The shaft sealing device 10 and the annular flange 1a of the front housing 1 act as individual isolation means, respectively, positively interposed between the bearing device 11 and the heat generating chamber 7 in which a rotor element 13 having a flat plate shape is secured to the innermost end of the drive shaft 12 in a press-fit manner.

Within the heat generating chamber 7, spacings are defined as fine clearances formed between the inner faces of the chamber 7 and the outer faces of the rotor element 13, and filled with a viscous fluid consisting of silicone oil. At this stage, the spacing within the heat generating chamber 7 should not be entirely filled with the silicone oil but is filled with a mixture of the silicone oil and air having a volumetric mixing rate of 80% of silicone oil and 20% of air so that even if the viscous fluid is thermally expanded, leaking or oozing of the silicone oil from the heat generating chamber can be prevented.

As clearly shown in FIG. 1A, the drive shaft 12 has mounted thereon a pulley member 15 secured to an outermost end of the drive shaft 12 by a screw bolt 14. The pulley member 15 is connected to a rotary drive source such as an automobile engine via a belt (not shown). Namely, the drive shaft 12 can be rotatively driven by the rotary drive source.

When the viscous fluid type heat generator is incorporated in an automobile heating system or an automobile climate control system, and when the drive shaft 12 is driven by the automobile engine via the belt and pulley member 15, the rotor element 13 is rotated together with the drive shaft 12 within the heat generating chamber 7. Therefore, the silicone oil existing in the spacings between the inner faces of the heat generating chamber 7 and the outer faces of the rotor element 13 is subjected to a shearing action in response to the rotation of the rotor element 13, and generates heat. The generated heat of the silicone oil is transmitted through the rear plate 2 to the heat exchanging liquid, e.g., water in the heat receiving chamber. That is to say, the heat is absorbed by the water by the heat exchanging action. The hot water having absorbed the heat is delivered from the heat receiving cheer RW via the outlet port 9 toward the external heating system or the climate control system for warming the automobile passenger compartment.

During the heat generating operation of the viscous fluid type heat generator, the viscous fluid, i.e., the silicone oil is thermally expanded due to heat generation. Nevertheless, since the shaft sealing device 10 is provided with an annular rubber element which is pressed against the outer circumference of the drive shaft 12 by a built-in garter spring to resultingly hermetically seal a shaft portion located in the heat generating chamber 7, the silicone oil is prevented from oozing out of the heating chamber 7. Thus, the silicone oil neither leaks into the external atmosphere around the heat generator itself nor reaches the bearing device 11. The thermal expansion of the silicone oil can be mostly absorbed by compression of the air mixed with the silicone oil. Therefore, it is understood that in the viscous fluid type heat generator of the described embodiment, the viscous fluid consisting of the silicone oil does not enter or permeate into the interior of the bearing device 11. Accordingly, the grease filled in the bearing device 11 is not urged to flow away from the bearing device 11.

Further, the existence of the shaft sealing device 10 and the annular flange 1a of the front housing 1 permits the bearing device 11 to be spatially isolated from the heat generating chamber 7, and accordingly, the bearing device 11 is not directly heated by the heat generated within the heat generating chamber 7. More specifically, since the bearing device 11 is received in the bearing chamber of the boss 1b of the front housing 1, the bearing device 11 is easily and constantly in contact with the atmospheric air so as to be cooled by the air during the operation of the heat generator. Therefore, loss of the grease from the bearing device 11 can be prevented.

From the foregoing description of the described embodiment of the present invention, it will be understood that the bearing device 11 rotatably supporting the drive shaft 12 hardly suffers from lack of lubrication until the end of a long operating life of the viscous fluid type heat generator, due to the existence of the first and second isolation means i.e., the shaft sealing device 10 and the annular flange 1a of the front housing 1.

It should be understood that the above-described embodiment of the present invention may be altered so that a solenoid clutch is alternately used in place of the pulley element 15 for introducing the drive power from the rotary drive source. Then, the heat generator may be driven intermittently by the ON or OFF action of the solenoid clutch.

Figure 2:
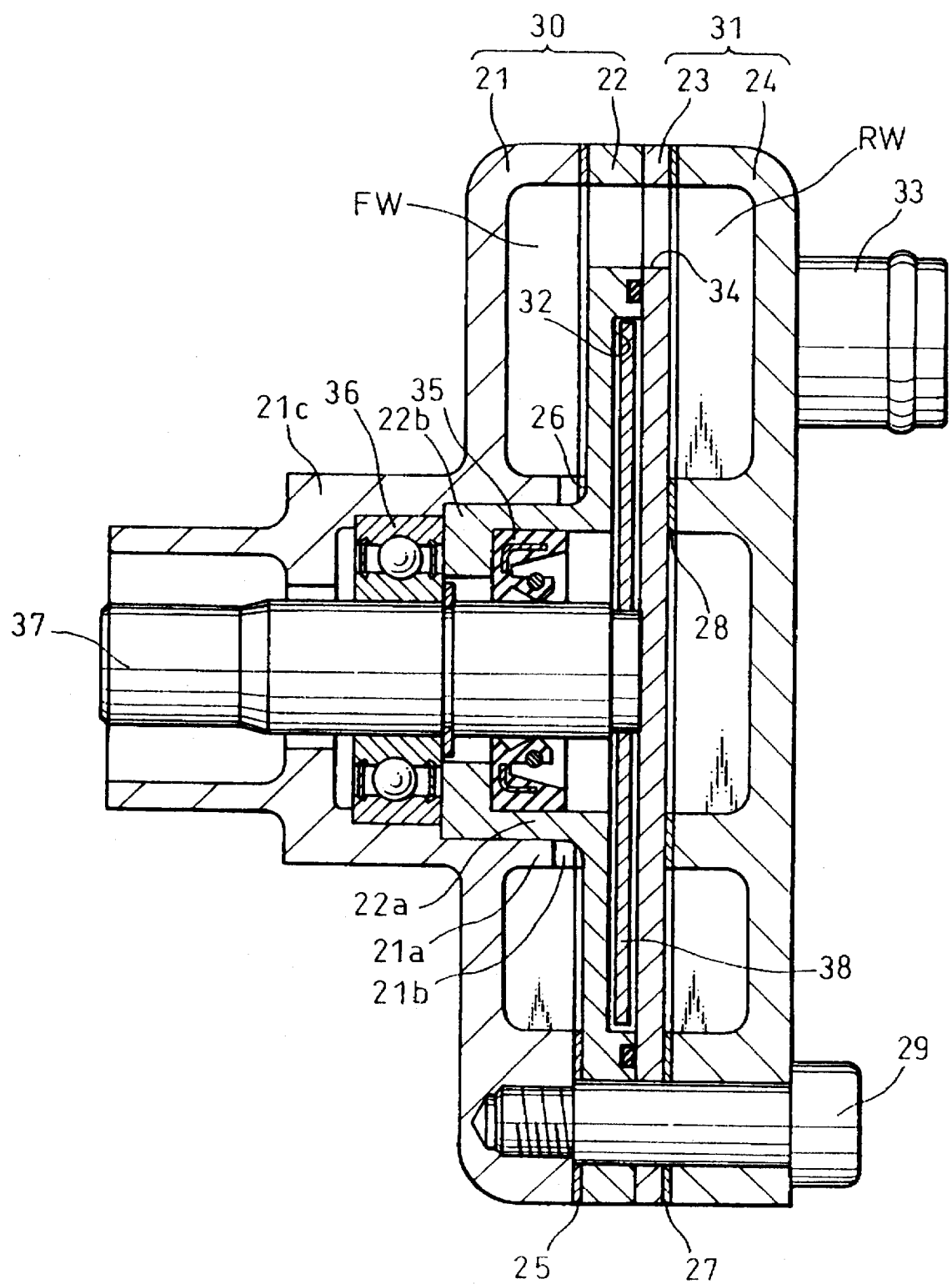
FIG. 2 is a cross-sectional view of a viscous fluid type heat generator according to another embodiment of the present invention.

Referring to FIG. 2, illustrating a different embodiment of the present invention, the viscous fluid type heat generator includes a front housing body 21, a front plate 22, a rear plate 23, and a rear housing body 24. The front housing body 21, the front plate 22, the rear plate 23, and the rear housing body 24 are secured to one another in an axial direction by a plurality of long screw bolts 29 via gaskets 25 through 28 interposed between the front housing body 21 and the front plate 22 and between the rear plate 23 and the rear housing body 24.

The front housing body 21 and the front plate 22 constitute a front housing 30, and the rear plate 23 and the rear housing body 24 constitute a rear housing 31. The front plate 22 is preferably made of a plate of aluminum system material having a good thermal conductivity, and is provided with a cylindrical counterbored portion formed at its rear face and having a large diameter. The counterbored portion of the front plate 22 cooperates with a flat front face of the rear plate 23 to define a heat generating chamber 32 therebetween. The front housing body 21 and the front end face of the front plate 22 define a front heat receiving chamber FW therebetween which is arranged to neighbor with the front side of the heat generating chamber 32. The rear end face of the rear plate 23 and the rear housing body 24 define a rear heat receiving chamber RW which is arranged adjacent to the rear side of the heat generating chamber 32.

The rear housing body 24 of the rear housing 31 is provided with an inlet port 33 for introducing heat exchanging liquid, e.g., water from an external heating system into the front and rear heat receiving chambers FW and RW, and an outlet port (not shown in FIG. 2) for delivering the heat exchanging liquid from the heat receiving chambers FW and RW. These inlet and outlet ports are arranged at portions of the outer periphery of the rear housing body 24 so that they open into the rear heat receiving chamber RW.

The front and rear plates 22 and 23 are provided with a plurality of through-bores 34 for providing a fluid communication between the front and rear heat receiving chambers FW and RW. The plurality of through-bores 34 are arranged equidistantly in the circumferential direction, and permit the heat exchanging fluid to flow therethrough from the rear heat receiving chamber RW toward the front heat receiving chamber FW and vice versa.

The front plate 22 is provided with a front boss 22a axially projecting frontward from a central portion of the front face thereof. The front boss 22a defines a cylindrical chamber in which a shaft sealing device 35 is disposed to form a first isolation means. The front boss 22a of the front plate 22 is provided with an annular flange 22b formed at a frontmost end thereof to form a second isolation means.

The front housing body 21 of the front housing 30 is internally provided with an annular boss 21a axially extending toward the front face of the front plate 22, and terminating at a position adjacent to the heat generating chamber 32. The annular boss 21a is provided with a plurality of radial through-bores 21b formed at the end thereof so as to open into the front heat receiving chamber FW. Thus, the front heat receiving chamber FW has a portion thereof positioned adjacent to the heat generating chamber 32 via a portion of the boss 22a surrounding the shaft sealing device 35.

The front housing body 21 of the front housing 30 is further provided with an outer boss 21c axially extending frontward (the leftward in FIG. 2) from a central portion of the front end face of the body 21. The boss 21c of the front housing body 21 forms therein a cylindrical bearing chamber in which a bearing device 36 including a single anti-friction bearing is received to rotatably support a drive shaft 37. An inner end portion of the drive shaft 37 extending into the heat generating chamber 32 is fluidly sealed by the afore-mentioned shaft sealing device 35. The drive shaft 37 mounts thereon a flat-plate like rotor element 38 secured to the innermost end of the drive shaft 37 in a press-fit manner, and the rotor element 38 is arranged within the heat generating chamber 32 to be rotated with the drive shaft 37.

The other construction of the present embodiment of FIG. 2 is similar to the afore-described embodiment of FIGS. 1A and 1B. Thus, the operation of the viscous fluid type heat generator of this embodiment can be considered similar to that of the heat generator of the embodiment of FIGS. 1A and 1B. Therefore, the heat generator of FIG. 2 can enjoy the afore-mentioned various advantages described in connection with the embodiment of FIGS. 1A and 1B.

It should be understood that the viscous fluid type heat generator of the embodiment of FIG. 2 may be provided with heat transmitting fins similar to the fins 21c through 21f of the embodiment of FIGS. 1A and 1B within the front and rear heat receiving chambers FW and RW, as required.

Figure 3:
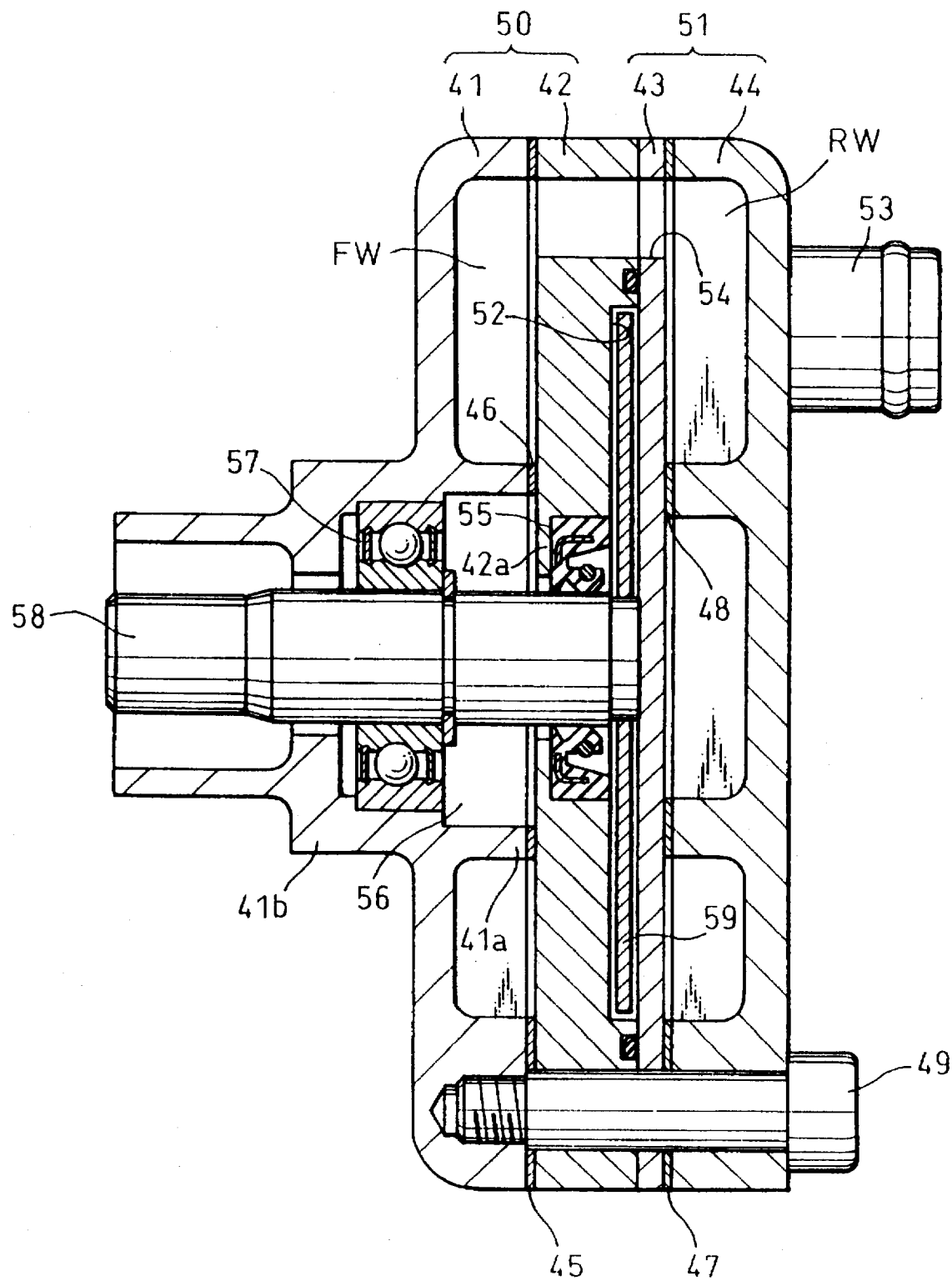
FIG. 3 is a cross-sectional view of a viscous fluid type heat generator according to a still another embodiment of the present invention.

FIG. 3 illustrates a further embodiment of the present invention. In FIG. 3, a viscous fluid type heat generator includes a front housing body 41, a front plate 42, a rear plate 43 and a rear housing body 44. The front housing body 41, the front plate 42, the rear plate 43 and the rear housing body 44 are axially hermetically secured together by a plurality of long screw bolts 49 via gaskets 45 through 48 which are interposed between the front housing body 41 and the front plate 42 and between the rear plate 43 and the rear housing body 44.

The front housing body 41 and the front plate 42 constitute a front housing 50, and the rear plate 43 and the rear housing body 44 constitute a rear housing 51.

The front plate 42 is preferably made of a plate of aluminum system material having a good thermal conductivity, and is provided with a cylindrical counter-bored portion formed at its rear face and having a large diameter. The counterbored portion of the front plate 42 cooperates with a flat front face of the rear plate 43 to define a heat generating chamber 52 therebetween. The front housing body 41 and the front end face of the front plate 42 define a front heat receiving chamber FW therebetween which is arranged adjacent to the front side of the heat generating chamber 52. The rear end face of the rear plate 43 made of a material having a good thermal conductivity such as aluminum and the rear housing body 44 define a rear heat receiving chamber RW which is arranged adjacent to the rear side of the heat generating chamber 52.

The rear housing body 44 of the rear housing 51 is provided with an inlet port 53 for introducing heat exchanging liquid, e.g., water from an external heating system into the front and rear heat receiving chambers FW and RW, and an outlet port (not shown in FIG. 3) for delivering the heat exchanging liquid from the heat receiving chambers FW and RW. The inlet and outlet ports are arranged at portions of the outer periphery of the rear housing body 44 so that they open into the rear heat receiving chamber RW.

The front and rear plates 42 and 43 are provided with a plurality of through-bores 54 for providing a fluid communication between the front and rear heat receiving chambers FW and RW. The plurality of through-bores 54 similar to the through-bores 34 of the embodiment of FIG. 2 are arranged equidistantly in the circumferential direction, and permit the heat exchanging fluid to flow therethrough from the rear heat receiving chamber RW toward the front heat receiving chamber FW and vice versa.

The front plate 42 is provided with a centrally formed cylindrical recess in which a shaft sealing device 55 is disposed to form a first isolation means adjacent to the heat generating chamber 52. The front plate 42 is also provided with an annularly extending inner flange 42a which is axially arranged next to and axially supports the shaft sealing device 55. Thus, the inner flange 42a forms a second isolation means between the heat generating chamber 52 and a later-described bearing device 57.

The front housing body 41 of the front housing 50 is internally provided with a cylindrical boss 41a axially extending toward the front face of the front plate 42, and forming a closed and vacant cylindrical chamber 56 therein which is a third isolation means between the heat generating chamber 52 and the later-described bearing 57.

The front housing body 41 of the front housing 50 is further provided with an outer boss 41b axially extending outward from a central portion of the front end face of the body 41. The boss 41b of the front housing body 41 forms therein a cylindrical bearing chamber in which the bearing device 57 including a single anti-friction bearing is received to rotatably support a drive shaft 58. An inner end portion of the drive shaft 58 extending into the heat generating chamber 52 is fluidly sealed by the afore-mentioned shaft sealing device 55. The drive shaft 58 has mounted thereon a flat-plate like rotor element 59 secured to the innermost end of the drive shaft 58 in a press-fit manner, and the rotor element 59 is arranged within the heat generating chamber 52 to be rotated with the drive shaft 58.

The other construction of the viscous fluid type heat generator is similar to those of the afore-described embodiments of FIGS. 1A and 1B, and FIG. 2.

In the viscous fluid type heat generator according to the embodiment of FIG. 3, the closed vacant chamber 56 of the front housing body 41 is arranged as the third isolation means between the heat generating chamber 52 and the bearing device 57, and can operate, in cooperation with the shaft sealing device 55, so as to prevent the viscous fluid, i.e., the silicone oil from flowing from the heat generating chamber 52 toward the bearing device 57 even when the silicone oil generates heat and is thermally expanded. Naturally, the thermally expanded silicone oil can be prevented from oozing out of the heat generating chamber 52 toward the outside of the heat generator. The closed vacant chamber 56 which is spaced apart from the heat generating chamber 52 further contributes to thermally isolate the bearing device 57 from the heat generating chamber 52.

The heat generating and heat exchanging operations of the viscous fluid type heat generator of FIG. 3 are the same as those of the heat generators of FIGS. 1A and 1B, and FIG. 2.

Therefore, the viscous fluid type heat generator of FIG. 3 can operate continuously for a long time while maintaining an optimum lubricating condition of the bearing device 57. Thus, the heat generator can certainly have a long operating life.

From the foregoing description, it will be understood that in accordance with the present invention, a viscous fluid type heat generator to be incorporated in a heating system of a climate control system of not exclusively but preferably an automobile can certainly maintain a good lubrication of the bearing device incorporated therein, and accordingly, have a substantially unlimited long operating life.

It should be understood that many and various modification and variations will occur to persons skilled in the art without departing from the scope and spirit of the invention claimed in the accompanying claims.

What we claim:

1. A viscous fluid type heat generator comprising:

front and rear housings for defining therein, at least a heat generating chamber having inner walls;

a heat receiving chamber arranged in at least one of said front and rear housings separated from said heat generating chamber and defining therein a fluid flow passage extending in close relation with said heat generating chamber and permitting a heat exchanging liquid to circulate therethrough;

a drive shaft rotatably supported by said front housing via bearing means;

a rotor element mounted on the drive shaft so as to be rotated therewith within said heat generating chamber and having outer faces viscous fluid supplied in a space extending between said inner walls of said heat generating chamber and said outer faces of said rotor element to generate heat in response to rotation of said rotor element; and an intermediate isolation means disposed between said heat generating chamber and said bearing means for providing a thermal isolation therebetween wherein said intermediate isolation means comprises a shaft sealing means arranged in said front housing for fluidly sealing around said drive shaft.

2. A viscous fluid type heat generator according to claim 1, wherein said intermediate isolation means comprises a closed vacant chamber formed and enclosed by a portion of said inner walls of said front housing.

3. A viscous fluid type heat generator according to claim 1, wherein said intermediate isolation means further comprises a closed vacant chamber axially juxtaposed with said shaft sealing unit, said combination of said shaft sealing unit and said closed vacant chamber being axially disposed between said heat generating chamber and said bearing means.

4. A viscous fluid type heat generator according to claim 1, wherein said bearing means for supporting said drive shaft is mounted in a bearing chamber formed in a portion of said front housing.

5. A viscous fluid type heat generator according to claim 4, wherein said portion of said front housing comprises an axially projecting front boss portion formed in said front housing at a central portion thereof.

6. A viscous fluid type heat generator according to claim 5, wherein said bearing chamber of said front housing is in direct communication with the atmosphere outside said heat generator.

7. A viscous fluid type heat generator according to claim 1, wherein said heat receiving chamber comprises a pair of chambers formed in said front housing and said rear housing, and fluidly communicating with one another, said pair of chambers of said heat receiving chambers are arranged on axially opposite sides of said heat generating chamber.

8. A viscous fluid type heat generator according to claim 1, wherein said rotor element comprises a generally flat plate member press-fitted in an end of said drive shaft within said heat generating chamber.

9. A viscous fluid type heat generator according to claim 1, wherein said heat receiving chamber is arranged in said rear housing, said rear housing including a rear plate and a rear housing body which are secured together to define therein said heat receiving chamber, said rear plate forming a partition wall between said heat generating chamber and said heat receiving chamber.

10. A viscous fluid type heat generator according to claim 9, wherein said rear plate is provided with a plurality of fins disposed in said heat receiving chamber.

11. A viscous fluid type heat generator according to claim 1, wherein said front housing comprises a front housing body and a front plate, and wherein said rear housing comprises a rear housing body and a rear plate, said front housing body, said front plate, said rear housing body, and said rear plate being axially connected together to define said heat generating chamber between said front and rear plates, said heat receiving chamber including a front heat receiving chamber defined between said front housing body and said front plate, and a rear heat receiving chamber defined between said rear plate and said rear housing body.

12. A viscous fluid type heat generator according to claim 11, wherein said front and rear heat receiving chambers of said heat receiving chamber are in communicating with one another by at least one through-bore formed in said front and rear plates at marginal portions thereof.

* * * * *